US008057689B2

(12) United States Patent
Isowaki et al.

(10) Patent No.: US 8,057,689 B2
(45) Date of Patent: Nov. 15, 2011

(54) METHOD OF MANUFACTURING MAGNETIC RECORDING MEDIUM

(75) Inventors: Yousuke Isowaki, Yokohama (JP); Kaori Kimura, Kawasaki (JP); Yoshiyuki Kamata, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/705,490

(22) Filed: Feb. 12, 2010

(65) Prior Publication Data
US 2010/0214695 A1 Aug. 26, 2010

(30) Foreign Application Priority Data

Feb. 20, 2009 (JP) ................................. 2009-038206

(51) Int. Cl.
*B44C 1/22* (2006.01)
(52) U.S. Cl. ............... 216/22; 216/40; 216/75; 438/754
(58) Field of Classification Search .................... 216/22, 216/40, 51, 67, 75; 438/736, 754, 785
See application file for complete search history.

(56) References Cited

U.S. PATENT DOCUMENTS

| 6,014,296 | A * | 1/2000 | Ichihara et al. ............... 360/135 |
|---|---|---|---|
| 6,221,519 | B1 | 4/2001 | Doi et al. |
| 6,266,354 | B1 | 7/2001 | Chino et al. |
| 6,984,529 | B2 * | 1/2006 | Stojakovic et al. .............. 438/3 |
| 7,067,207 | B2 | 6/2006 | Kamata et al. |
| 2001/0055852 | A1 * | 12/2001 | Moise et al. ................... 438/396 |
| 2002/0090827 | A1 * | 7/2002 | Yokoshima ................... 438/714 |
| 2004/0253817 | A1 | 12/2004 | Imada et al. |
| 2005/0000934 | A1 * | 1/2005 | Nakatani et al. ................. 216/13 |
| 2005/0243467 | A1 | 11/2005 | Takai et al. |
| 2005/0284842 | A1 | 12/2005 | Okawa et al. |
| 2006/0021966 | A1 | 2/2006 | Hattori et al. |
| 2006/0124585 | A1 | 6/2006 | Suwa et al. |
| 2006/0183004 | A1 * | 8/2006 | Hattori et al. ............. 428/833.1 |
| 2006/0222897 | A1 | 10/2006 | Kamata et al. |

(Continued)

FOREIGN PATENT DOCUMENTS

JP 02-207418 8/1990

(Continued)

OTHER PUBLICATIONS

Explanation of Non-English Language References.

(Continued)

*Primary Examiner* — Lan Vinh
(74) *Attorney, Agent, or Firm* — Knobbe Martens Olson & Bear LLP (57) ABSTRACT

According to one embodiment, a method of manufacturing a magnetic recording medium includes forming a first hard mask, a second hard mask and a resist on a magnetic recording layer, imprinting a stamper to the resist to transfer patterns of protrusions and recesses to the resist, removing residues remaining in the recesses of the patterned resist by means of a first etching gas, etching the second hard mask by means of the first etching gas using the patterned resist as a mask to transfer the patterns to the second hard mask, etching the first hard mask by means of a second etching gas different from the first etching gas using the second hard mask as a mask to transfer the patterns to the first hard mask, and performing ion beam etching in order to deactivate the magnetic recording layer exposed in the recesses and to remove the second hard mask.

10 Claims, 4 Drawing Sheets

U.S. PATENT DOCUMENTS

| | | |
|---|---|---|
| 2006/0222899 A1 | 10/2006 | Sugimura et al. |
| 2007/0070547 A1 | 3/2007 | Kamata et al. |
| 2007/0224339 A1 | 9/2007 | Kamata et al. |
| 2007/0263324 A1 | 11/2007 | Allen et al. |
| 2007/0281078 A1 | 12/2007 | Kikitsu et al. |
| 2008/0075845 A1 | 3/2008 | Sonobe et al. |
| 2008/0078739 A1 | 4/2008 | Hibi et al. |
| 2008/0093336 A1 | 4/2008 | Lee et al. |
| 2008/0158718 A1 | 7/2008 | Kobayashi et al. |
| 2008/0174914 A1 | 7/2008 | Takai et al. |
| 2008/0217615 A1 | 9/2008 | Kerber |
| 2009/0023078 A1 | 1/2009 | Gutmann et al. |
| 2009/0305081 A1 | 12/2009 | Dai et al. |
| 2009/0308837 A1 | 12/2009 | Albrecht et al. |
| 2010/0018946 A1 | 1/2010 | Isowaki et al. |
| 2010/0018947 A1 | 1/2010 | Kimura et al. |
| 2010/0047625 A1 | 2/2010 | Kamata et al. |
| 2010/0053813 A1 | 3/2010 | Fukushima et al. |
| 2010/0059476 A1 | 3/2010 | Yamamoto et al. |
| 2010/0147791 A1 | 6/2010 | Isowaki et al. |
| 2010/0214694 A1 | 8/2010 | Kimura et al. |
| 2010/0215989 A1 | 8/2010 | Isowaki et al. |

FOREIGN PATENT DOCUMENTS

| | | |
|---|---|---|
| JP | 03-040219 | 2/1991 |
| JP | 05-205257 | 8/1993 |
| JP | 11-328652 | 11/1999 |
| JP | 2000-286241 | 10/2000 |
| JP | 2002-501300 | 1/2002 |
| JP | 2002-359138 | 12/2002 |
| JP | 2003-183859 | 7/2003 |
| JP | 2004-164692 | 6/2004 |
| JP | 2005-042143 | 2/2005 |
| JP | 2005-050468 | 2/2005 |
| JP | 2005-050468 A | 2/2005 |
| JP | 2005-056535 | 3/2005 |
| JP | 2005-070650 | 3/2005 |
| JP | 2005-071542 | 3/2005 |
| JP | 2005-317155 | 11/2005 |
| JP | 2006-012332 | 1/2006 |
| JP | 2006-012332 A | 1/2006 |
| JP | 2006-147148 | 6/2006 |
| JP | 2006-147148 A | 6/2006 |
| JP | 2006-196143 | 7/2006 |
| JP | 2007-095115 | 4/2007 |
| JP | 2007-095115 A | 4/2007 |
| JP | 2008-065944 | 3/2008 |
| JP | 2008-135092 | 6/2008 |
| JP | 2008-210450 | 9/2008 |
| JP | 2009-076924 | 4/2009 |
| JP | 2009-170007 | 7/2009 |
| JP | 2009-181674 | 8/2009 |
| JP | 2009-301655 | 12/2009 |
| JP | 2010-033636 | 2/2010 |
| WO | WO 99/35657 | 7/1999 |
| WO | WO 2008/069082 | 6/2008 |

OTHER PUBLICATIONS

Translation of the Notice of Reasons for Rejection mailed by JPO on Oct. 13, 2009 for Japanese Patent Application No. 2008-192537 (corresponding to U.S. Appl. No. 12/508,269).

Translation of the Notice of Reasons for Rejection mailed by JPO on Mar. 9, 2010 for Japanese Patent Application No. 2008-317382 (corresponding to U.S. Appl. No. 12/636,610).

Translation of the Notice of Reasons for Rejection mailed by JPO on Nov. 17, 2009 for Japanese Patent Application No. 2008-213674 (corresponding to U.S. Appl. No. 12/544,606).

Translation of the Notice of Reasons for Rejection mailed by JPO on Oct. 13, 2010 for Japanese Patent Application No. 2008-192536 (corresponding to U.S. Appl. No. 12/509,261).

Translation of the Notice of Reasons for Rejection mailed by JPO on Feb. 2, 2010 for Japanese Patent Application No. 2008-192536 (corresponding to U.S. Appl. No. 12/509,261).

Translation of the Notice of Reasons for Rejection mailed by JPO on Apr. 20, 2010 for Japanese Patent Application No. 2009-038207 (corresponding to U.S. Appl. No. 12/705,456).

Translation of the Notice of Reasons for Rejection mailed by JPO on Apr. 20, 2010 for Japanese Patent Application No. 2009-038206 (corresponding to U.S. Appl. No. 12/705,490).

Translation of the Notice of Reasons for Rejection mailed by JPO on Apr. 20, 2010 for Japanese Patent Application No. 2009-038208 (corresponding to U.S. Appl. No. 12/705,421).

* cited by examiner

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2009-038206, filed Feb. 20, 2009, the entire contents of which are incorporated herein by reference.

BACKGROUND

1. Field

One embodiment of the present invention relates to a method of manufacturing a magnetic recording medium, such as a patterned medium.

2. Description of the Related Art

In recent years, the problem that improvement in track density is disturbed by interference between adjacent tracks has arisen with respect to a magnetic recording medium mounted on a hard disk drive (HDD). In particular, it is an important technical subject to reduce the fringe effect of a write head field.

As measures against this problem, a discrete track recording (DTR) medium has been developed, which is configured to physically separate recording tracks by processing a ferromagnetic layer. With the DTR medium, it is feasible to reduce side erase (erasure of adjacent track information when writing) and side read (reading of adjacent track information when reading), so that track density can be increased. Therefore, the DTR medium is expected to be a magnetic recording medium capable of providing high recording density. Also, a bit-patterned medium (BPM), which has dotted magnetic patterns, is expected to be a magnetic recording medium capable of providing a high recording density.

As a process for manufacturing the patterned medium (DTR medium, BPM), the following method is known. The known method comprises forming a hard mask and a resist on a magnetic recording layer, transferring patterns of protrusions and recesses to the resist by an imprint technique, transferring the patterns of protrusions and recesses of the resist to the hard mask and etching the magnetic recording layer using the hard mask as an etching mask to thereby form the magnetic recording layer with the patterns of protrusions and recesses.

A technology employing two hard mask layers is disclosed as an example of the above method in Jpn. Pat. Appln. KOKAI Publication Nos. 2005-50468 and 2006-12332. In the references, the technology relating to the step of removing any imprint residue of the resist, transferring patterns to the hard mask lying immediately beneath the resist and transferring patterns to the lowermost hard mask layer are disclosed, which are carried out using different etching gases. In the disclosed technology, when the etching selectivity between the resist and the hard mask lying immediately beneath the resist is very high (for example, 10 or higher), desirable processing can be performed. In contrast, when the selectivity is not sufficient, the resist mask is further etched during etching the hard mask lying immediately beneath the resist, so that an undesirably small pattern width results. Consequently, a low land/groove ratio (namely, a ratio of protruded pattern width to recessed pattern width) results. Therefore, the problem that satisfactory signal quality cannot be obtained in write and read with a head after mounting the medium on a drive arises.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of manufacturing a magnetic recording medium, comprising: forming a first hard mask, a second hard mask and a resist on a magnetic recording layer; imprinting a stamper to the resist to transfer patterns of protrusions and recesses to the resist; removing residues remaining in the recesses of the patterned resist by means of a first etching gas; etching the second hard mask by means of the first etching gas using the patterned resist as a mask to transfer the patterns of protrusions and recesses to the second hard mask; etching the first hard mask by means of a second etching gas different from the first etching gas using the second hard mask as a mask to transfer the patterns of protrusions and recesses to the first hard mask; and performing ion beam etching in order to deactivate the magnetic recording layer exposed in the recesses and to remove the second hard mask.

Figure 1:
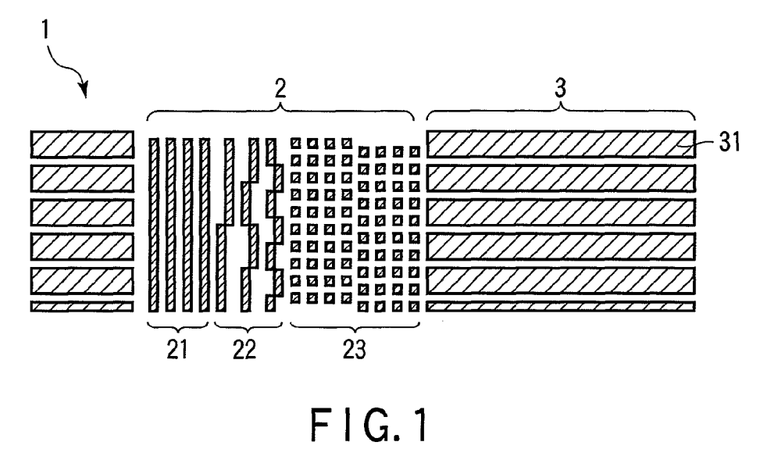
FIG. 1 is the plain view along a circumferential direction of a discrete track (DTR) medium manufactured in accordance with the method of the present invention.

The plane view along a circumferential direction of a discrete track recording (DTR) medium, which is an example of a patterned medium, manufactured in accordance with the method of the present invention is given in FIG. 1. As shown in FIG. 1, servo region 2 and data region 3 are alternately disposed along the circumferential direction of patterned medium 1. The servo region 2 includes preamble section 21, address section 22 and burst section 23. The data region 3 includes discrete tracks 31 in which adjacent tracks are separated from each other.

Figure 2:
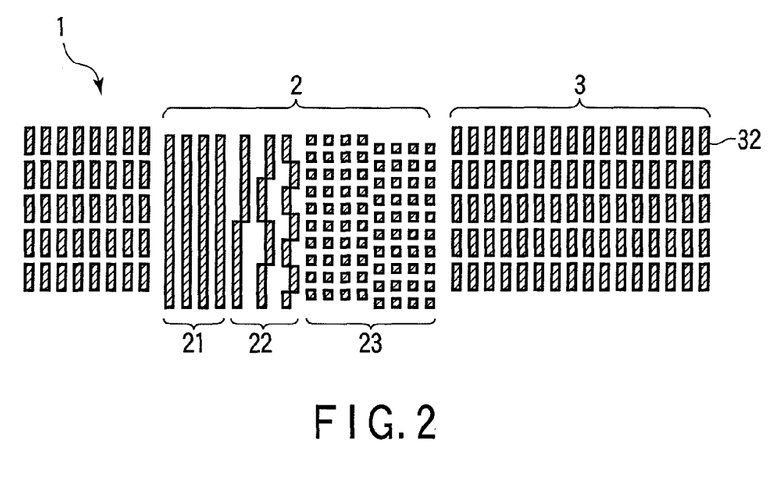
FIG. 2 is the plane view along a circumferential direction of a bit-patterned medium manufactured in accordance with the method of the present invention.

The plane view along a circumferential direction of a bit-patterned medium (BPM), which is another example of a patterned medium, manufactured in accordance with the method of the present invention is given in FIG. 2. In this patterned medium, magnetic dots 32 are disposed in data region 3.

Referring to FIGS. 3A-3H, an example of the method of manufacturing a magnetic recording medium according to the present invention will be described below.

Figure 3A:
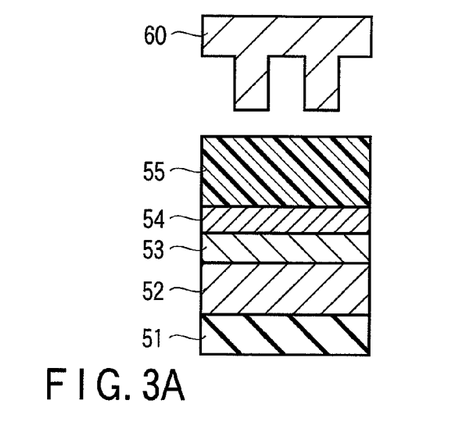
FIGS. 3A-3H are cross-sectional views illustrating an example of the method of manufacturing a magnetic recording medium according to the present invention.

Referring to FIG. 3A, an underlayer (not shown) and magnetic recording layer 52 with a thickness of 20 nm are formed on glass substrate 51. A first hard mask 53 of carbon having a thickness of 15 nm and a second hard mask 54 of silicon having a thickness of 3 nm are formed on the magnetic recording layer 52. The second hard mask 54 is spin-coated with a resist 55. Separately, stamper 60 with, for example, given patterns of protrusions and recesses corresponding to the patterns of the DTR medium shown in FIG. 1 is provided. The stamper 60 is manufactured through electron beam lithography, nickel electroforming and injection molding. The stamper 60 is arranged so that its plane of protrusions and recesses faces the resist 55.

Figure 3B:
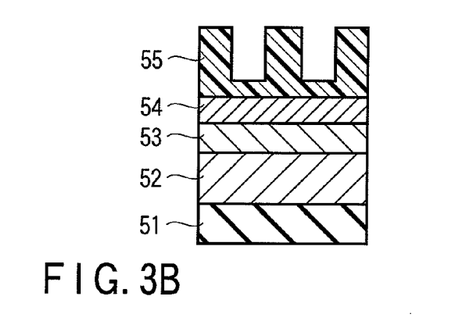

Referring to FIG. 3B, imprinting with the stamper 60 to the resist 55 is carried out, so that the patterns of protrusions and recesses of the stamper 60 is transferred to the resist 55. Thereafter, the stamper 60 is removed. Resist residues remain on the bottoms of the recesses of the patterns transferred to the resist 55.

Figure 3C:
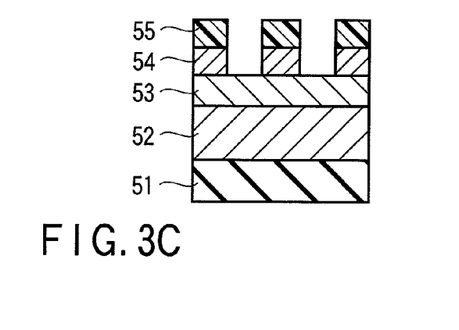

Referring now to FIG. 3C, the removal of the resist residues remaining at the recesses and the transfer of the patterns to the second hard mask are carried out simultaneously by means of dry etching using the same first etching gas to thereby expose the surface of the first hard mask. For example, an inductively coupled plasma reactive ion etching (ICP-RIE) system is employed and $CF_4$ is used as the etching gas.

Subsequently, referring to FIG. 3D, the first hard mask 53 is etched with a second etching gas different from the first etching gases using the patterned second hard mask 54 as a mask to thereby transfer the patterns and expose the surface of the magnetic recording layer 52 at the recesses. In the etching, for example, ICP-RIE is employed and oxygen is used as the second etching gas. At that time, a part or the entirety of the resist remaining on the patterns of the second hard mask 54 is removed, so that patterns of protrusions and recesses mainly composed of the first hard mask 53 and the second hard mask 54 are provided.

Figure 3D:
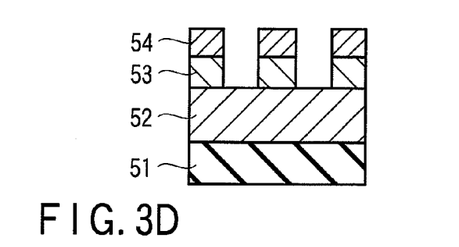
Figure 3E:
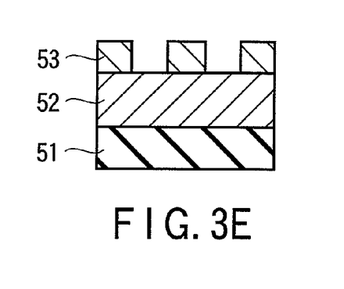

Further, referring to FIG. 3E, the second hard mask remaining on the protrusions is removed by dry etching. For example, ICP-RIE is employed and $CF_4$ is used as the etching gas. As the removing can be carried out simultaneously with the step of etching the magnetic recording layer by means of ion beam etching, this step is not always necessary and can be omitted.

Figure 3F:
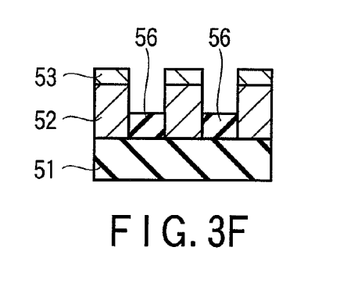

Referring now to FIG. 3F, ion beam etching makes it possible not only to remove the remaining second hard mask 54 (in the event of omitting the step of FIG. 3E) but also to deactivate the magnetic recording layer 52 at the recesses to thereby form a nonmagnetic layer 56. When the second hard mask 54 is removed, a part of the magnetic recording layer 52 at the recesses can be etched. However, as the magnetic recording layer 52 at the recesses is made nonmagnetic as a result of deactivation, a favorable fringe effect can be provided when the processed medium is mounted on a hard disk drive. For example, a mixture of helium and nitrogen can be used as the etching gas, and, for example, an electron cyclotron resonance (ECR) ion gun can be used as an ion beam device.

Figure 3G:
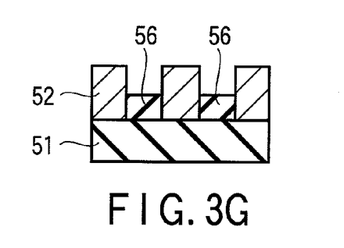

Further, referring to FIG. 3G, the remaining first hard mask 53 is removed. At that time, for example, ICP-RIE is employed and oxygen is used as the etching gas, thereby removing the first hard mask 53.

Figure 3H:
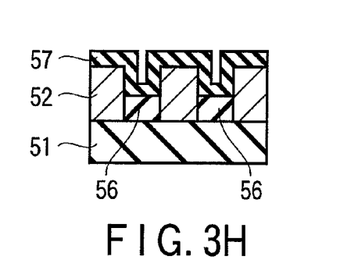

Thereafter, referring to FIG. 3H, protective film 57 with a thickness of 3 nm is formed by chemical vapor deposition (CVD).

In the above steps, the thickness of each of the various films and the depth of recesses thereof can be easily measured by, for example, an atomic force microscope (AFM), cross-sectional transmission electron microscopy (TEM) or the like. Moreover, the metal mask species and compositional proportion thereof can be easily determined by performing an energy dispersive X-ray spectroscopy (EDX) analysis. Further, the etching gas species used in the ion beam etching and the effect thereof can be inspected by analyzing any residual gas within the medium by means of X-ray photoelectron spectroscopy (XPS) analysis of the medium after the completion of the processing. Still further, the manufacturing method illustrated in FIG. 3 is not limited to the manufacturing of the DTR medium and is applicable to the manufacturing of a bit-patterned medium (BPM).

The steps of FIGS. 3C and 3D will be described in greater detail below. In the method of the present invention, referring to FIG. 3C, both the removal of any imprint residue of the resist and the transfer of the patterns to the second hard mask 54 are carried out using the same first etching gas. Subsequently, referring to FIG. 3D, the transfer of the patterns to the first hard mask 53 is carried out using a second etching gas different from the first etching gas.

When the removal of resist residue and the pattern transfer to the second hard mask are carried out independently using different gases in accordance with the method of the prior art, during the step of etching the second hard mask 54, it is necessary to provide a high etching selectivity between the resist and the second hard mask 54 in order to suppress etching of the resist as the mask. In contrast, in the method of the present invention, the etching of the second hard mask 54 is performed continuously from the moment at which the imprint residue of the resist is removed and the surface of the second hard mask 54 is exposed, so that it is not necessarily required to provide a high etching selectivity therebetween.

As mentioned hereinafter, patterns with a land/groove ratio higher than that of the prior art can be formed by the continuous etching. Moreover, in the method of the present invention, the etching selectivity between the first hard mask 53 and the second hard mask 54 can be increased by differentiating the second etching gas for use in the patterning of the first hard mask 53 from the first etching gas for use in the removal of resist residue and the patterning of the second hard mask 54. Consequently, a mask of favorable configuration with a high land/groove ratio can be formed. Further, in the method of the present invention, it is feasible to highly increase the degree of freedom of material choice, such as the thickness of the first hard mask 53.

The difference between the method of the prior art and the method of the present invention will be described below in greater detail with reference to the drawings.

FIGS. 4A-4D illustrate the method of manufacturing a magnetic recording medium according to the prior art, and FIGS. 5A-5D illustrate the method of manufacturing a magnetic recording medium according to the present invention.

First, referring to FIGS. 4A-4D, the manufacturing method according to the prior art will be described.

Figure 4A:
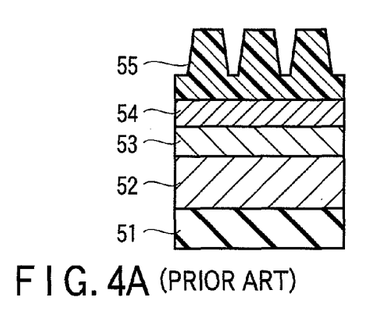
FIGS. 4A-4D are cross-sectional views illustrating a part of the method of manufacturing a magnetic recording medium according to the prior art.

FIG. 4A corresponds to FIG. 3B among the FIGS. 3A-3H illustrating the entirety of the manufacturing method. That is, the state immediately after imprinting of the resist 55 by means of the stamper 60 is shown. In FIG. 3B, the protruded patterns of the stamper 60 and the recessed patterns of the resist after imprinting are shown in a configuration having nearly rectangular corners. However, this configuration is diagrammatically shown, and in actuality, the protrusions of the stamper are designed to have a tapered configuration. Accordingly, the imprinted resist has grooves becoming narrower toward the groove bottom as shown in FIG. 4A. One of the reasons for tapering the protrusions of the stamper is to facilitate the removal of the stamper from the resist after imprinting.

Figure 4B:
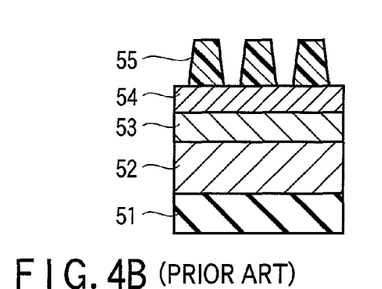

After imprinting, the removal of resist residue is carried out using oxygen (FIG. 4B). In this step, stopping the etching just at the moment of disappearance of resist residue is practically difficult, so that the stopping occurs in the state of slight overetching. At that time, as the etching rate of the resist to oxygen is high, a reduction in pattern width occurs because of the side-etching effect during overetching.

Figure 4C:
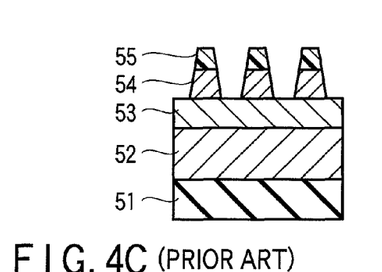

Subsequently, the etching of the second hard mask is carried out (FIG. 4C). This step is generally carried out using $CF_4$. When the second hard mask 54 consists of, for example, silicon, as the etching rate of the resist is as high as about twice that of silicon, the side etching of the resist advances even while the second hard mask 54 is being etched using $CF_4$. As a result, the width of the resist mask is further reduced and accordingly the mask width of the second hard mask 54 is also reduced.

Figure 4D:
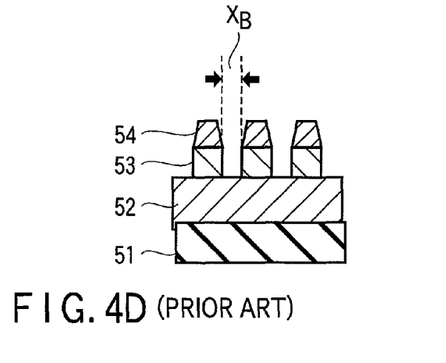

This step is followed by the transfer of the patterns of protrusions and recesses to the first hard mask (FIG. 4D). Because of the above series of side-etching effects, the mask width of the second hard mask is smaller than that provided in the resist after imprinting. Therefore, patterns with a land/groove ratio lower than that of the first hard mask are obtained.

Now, the manufacturing method according to the present invention will be described referring to FIGS. 5A-5D.

Figure 5A:
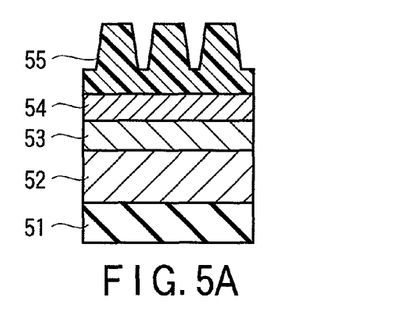
FIGS. 5A-5D are cross-sectional views illustrating a part of the method of manufacturing a magnetic recording medium according to the present invention.
Figure 5B:
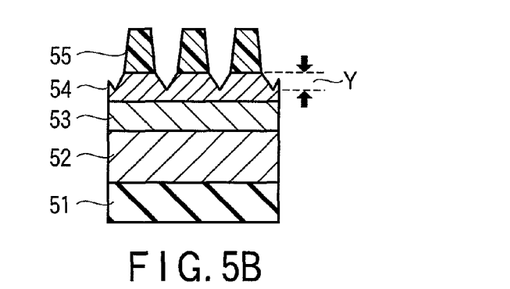
Figure 5C:
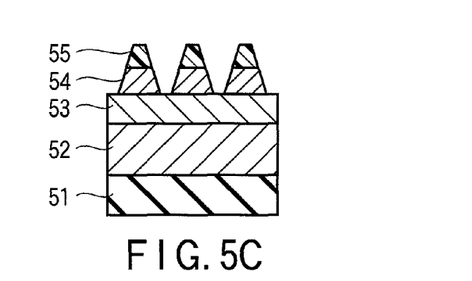

FIG. 5A, like FIG. 4A, corresponds to FIG. 3B, and shows the state immediately after the imprinting of the resist 55. The imprinting is followed by the simultaneous etching of the resist and second hard mask 54 using, for example, $CF_4$ (FIGS. 5B and 5C). Consequently, the etching of the second hard mask 54 is performed continuously from the moment at which the imprint residue of the resist is removed and the surface of the second hard mask 54 is exposed (FIG. 5B). Note that FIG. 5B is a view showing a halfway state of the step. Specifically, FIG. 5B is a view in which the resist mask has become about the same as in FIG. 4B. It is seen that in FIG. 5B, the etching of the second hard mask 54 is advanced by as much as Y nm in comparison with that of FIG. 4B. This step is stopped as soon as the first hard mask 53 is exposed. At this stage, it is seen that in FIG. 5C according to the method of the present invention, the width of exposure of the first hard mask 53 is less than that of FIG. 4C according to the prior art ($X_C<X_B$).

Figure 5D:
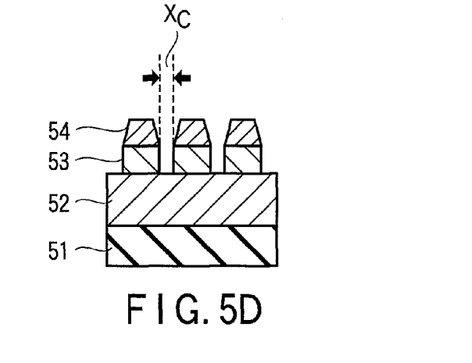

This step is followed by the transfer of the patterns of protrusions and recesses to the first hard mask (FIG. 5D). In the event of a manufacturing method using only a single layer of hard mask, the magnetic recording layer is etched using a hard mask tapered as shown in FIG. 4C or FIG. 5C, so that the configuration of formed protrusions and recesses of the magnetic recording layer is unfavorable. Therefore, generally, a bilayer hard mask (first hard mask 53 and second hard mask 54) is used, and the pattern transfer to the first hard mask 53 is carried out while suppressing tapering. The method of the present invention is also a manufacturing method using a bilayer hard mask. However, in the method of the present invention, a high etching selectivity can be provided using, in the transfer to the first hard mask 53, a second etching gas different from the first etching gas used in the etching of the resist and second hard mask 54. Consequently, while maintaining the width of recesses (Xc) of the second hard mask 54, the first hard mask 53 with a favorable configuration can be obtained. As apparent from the above, the method of the present invention enables forming patterns of magnetic recording layer with a high land/groove ratio.

Moreover, in the method of the present invention, recesses narrower than the half-width of the configuration of protrusions of the imprint stamper can be formed by regulating the etching time for the resist 55 and the second hard mask 54.

In the present invention, the same first etching gas encompasses not only etching gases of which elements are same each other, but also etching gases that, in the event of etching the second hard mask 54 using a gas for etching the resist mask, allow a difference in the etching rate of the second hard mask 54 to fall within 10%. For example, when the second hard mask 54 consists of silicon, suppose that the etching in the initial stage is carried out using $CF_4$ and in the middle a small amount of argon is added to the $CF_4$ to thereby switch to a mixture of $CF_4$ and argon. In that instance, as the etching rate with respect to the second hard mask 54 falls within 10% and is thus substantially unchanged, they are regarded as the same etching gas.

In the present invention, the second hard mask 54 is preferably selected from the group of Si, SiC, SiOC, $SiO_2$, SiN and SiON, or the group of Al, Ag, Au, Co, Cr, Cu, Ni, Pd and Pt.

The etching method and first etching gas used in the removal of resist residue and the etching of the second hard mask 54 in the present invention are selected so that an appropriate etching rate can be attained in the etching of the second hard mask 54. When the second hard mask 54 consists of, for example, Si, SiC, SiOC, $SiO_2$, SiN or SiON, it is preferred to carry out processing by means of reactive ion etching using any gas selected from $CF_4$, $SF_6$ and $CHF_3$. In contrast, when the second hard mask 54 consists of, for example, Al, Ag, Au, Co, Cr, Cu, Ni, Pd or Pt, it is preferred to carry out processing by means of ion beam etching using argon.

In the present invention, the thickness of the second hard mask 54 is set to fall within the range of 2 to 10 nm. Within the range, the thinner the better. Thicknesses of 1 nm or less are not favorable because flatness of the film cannot be secured and adhesion to the resist is poor. On the other hand, when the thickness of the second hard mask 54 exceeds 10 nm, the pattern width might become unfavorably small because of the side etching of the resist.

In the present invention, it is preferred to set the thickness of the first hard mask 53 to fall within the range of 4 to 50 nm. Preferably, the material of the first hard mask 53 is carbon. However, the material may mainly comprise carbon wherein the ratio of carbon exceeds 75% in terms of the ratio of number of atoms. By virtue of the use of carbon in the first hard mask 53, it becomes feasible to provide a high etching selectivity with the second hard mask 54 in the etching using oxygen as the second etching gas. However, when the thickness of a carbon layer is less than 4 nm, protrusions and recesses with an appropriate configuration cannot be formed in the magnetic recording layer because of the influence of side etching when etching the magnetic recording layer. When the thickness of a carbon layer is greater than 50 nm, protrusions and recesses with an appropriate configuration cannot be formed in the magnetic recording layer because of the influence of burrs occurring when etching the magnetic recording layer.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr—, CoZrNb— and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

<Protective Film>

The protective film is provided for the purpose of preventing corrosion of the perpendicular magnetic recording layer and also preventing the surface of a medium from being damaged when the magnetic head is brought into contact with the medium. Examples of the material of the protective film include those containing C, SiO2 or ZrO2. It is preferable to set the thickness of the protective film from 1 to 10 nm. Since such a thin protective film enables to reduce the spacing between the head and medium, it is suitable for high-density recording. Carbon may be classified into sp2-bonded carbon (graphite) and sp3-bonded carbon (diamond). Though sp3-bonded carbon is superior in durability and corrosion resistance to graphite, it is inferior in surface smoothness to graphite because it is crystalline material. Usually, carbon is deposited by sputtering using a graphite target. In this method, amorphous carbon in which sp2-bonded carbon and sp3-bonded carbon are mixed is formed. Carbon in which the ratio of sp3-bonded carbon is larger is called diamond-like carbon (DLC). DLC is superior in durability and corrosion resistance and also in surface smoothness because it is amorphous and therefore utilized as the surface protective film for magnetic recording media. The deposition of DLC by CVD (chemical vapor deposition) produces DLC through excitation and decomposition of raw gas in plasma and chemical reactions, and therefore, DLC richer in sp3-bonded carbon can be formed by adjusting the conditions.

Next, preferred manufacturing conditions in each process in the embodiments of the present invention will be described.

<Imprinting>

A stamper having patterns of recording tracks and servo data is pressed against a substrate on which a resist is applied and then the resist is cured, thereby to transfer the patterns of protrusions and recesses.

As the resist, for example, a UV curing resist or a general novolak-type photoresist may be used. When the UV curing resist is used, the stamper is preferably made of a transparent material such as quartz or resin. The UV curing resist is cured by applying ultraviolet ray. A high-pressure mercury lamp, for example, can be used as a light source of the ultraviolet ray. When the general novolak-type photoresist is used, the stamper may be made of a material such as Ni, quartz, Si and SiC. The resist can be cured by applying heat or pressure.

<Deactivation>

Deactivation means to weaken the magnetism of the magnetic recording layer at the recesses in comparison with that at the protrusions in a patterned magnetic recording medium. Weakening the magnetism means to render the layer soft magnetic, or nonmagnetic, or diamagnetic. These changes of magnetism can be observed by measuring the values of Hn, Hs, Hc, etc., with a vibrating sample magnetometer (VSM) or a magnetooptical Kerr effect measuring system.

<Deposition of Protective Film and Aftertreatment>

The carbon protective film is preferably deposited by CVD to improve coverage to the protrusions and recesses, but it may be deposited by sputtering or vacuum evaporation. The CVD produces a DLC film containing a large amount of sp3-bonded carbon. A lubricant is applied to the surface of the protective film. As the lubricant, for example, perfluoropolyether, fluorinated alcohol, fluorinated carboxylic acid or the like is used.

Figure 6:
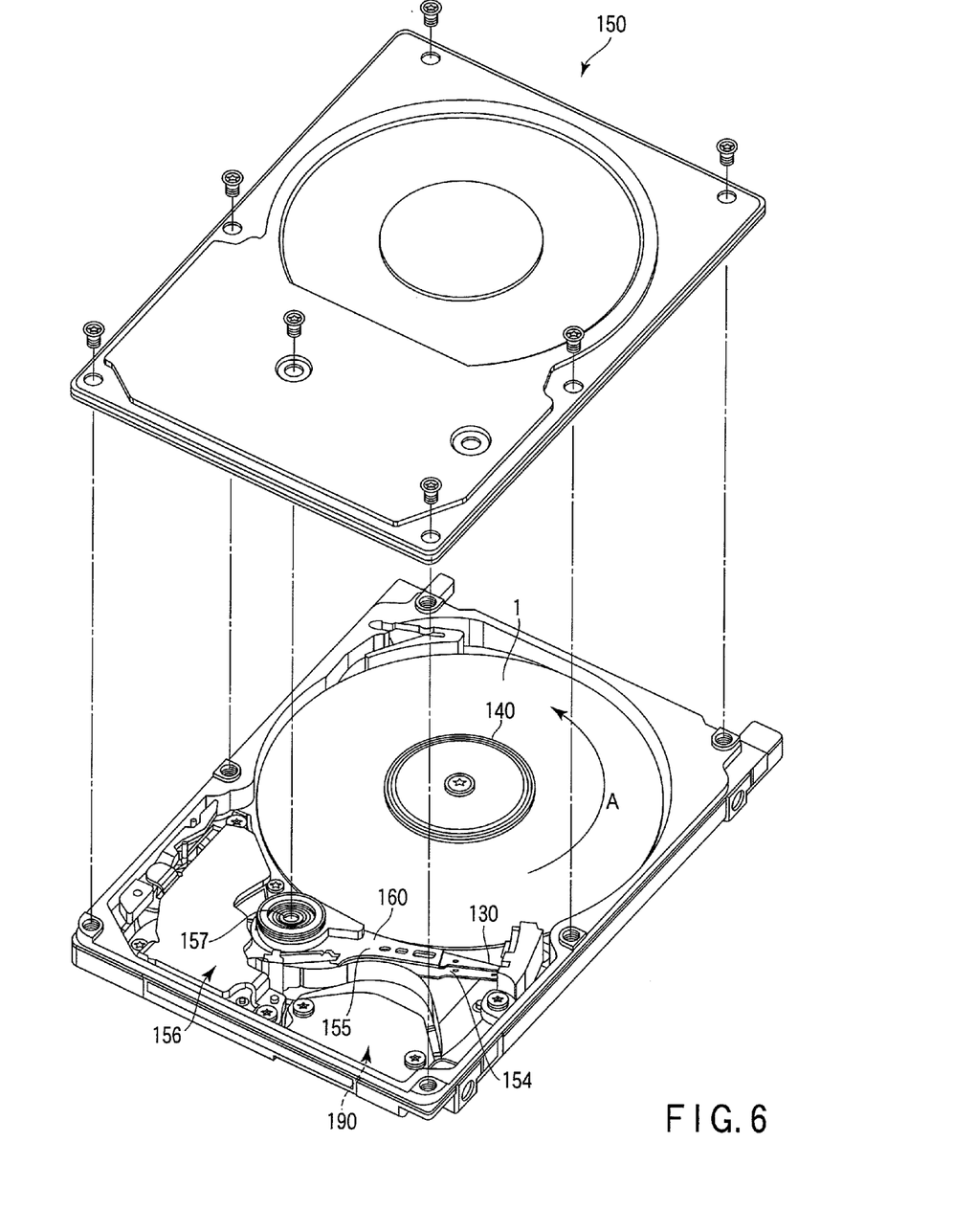
FIG. 6 is a perspective view illustrating a magnetic recording apparatus comprising the magnetic recording medium manufactured by the present invention.

Now, the magnetic recording apparatus (HDD) will be described below. FIG. 6 is a perspective view of a magnetic recording apparatus in which the magnetic recording medium manufactured according to the present invention is installed.

As shown in FIG. 6, the magnetic recording apparatus 150 according to the embodiment is of a type using a rotary actuator. The patterned medium 1 is attached to the spindle 140, and is rotated in the direction of arrow A by a motor (not shown) that responds to control signals from a drive controller (not shown). The magnetic recording apparatus 150 may comprise a plurality of patterned media 1.

The head slider 130 configured to read from and write to the patterned medium 1 is attached to the tip of the film-like suspension 154. The head slider 130 has a magnetic head mounted near the tip thereof. When the patterned medium 1 rotates, the air bearing surface (ABS) of the head slider 130 is held at a predetermined height so as to fly over the surface of the magnetic disk 200 under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the patterned medium 1.

EXAMPLES

Example 1

Using a stamper with patterns of protrusions and recesses corresponding to those of the DTR medium of FIG. 1, a DTR medium was manufactured in accordance with the method illustrated in FIGS. 3A-3H. The conditions of each of the steps performed in this respect were as follows.

Exposing the surface of a first hard mask by the removal of resist residue and the etching of a second hard mask as illustrated in FIG. 3C were carried out by employing ICP-RIE, using $CF_4$ as a first etching gas, and establishing a gas pressure of 0.1 Pa, antenna power of 500 W, bias power of 20 W and etching time of 30 seconds.

Exposing the surface of the magnetic recording layer 52 by etching the first hard mask 53 as illustrated in FIG. 3D was carried out by employing ICP-RIE, using oxygen as a second etching gas, and establishing a gas pressure of 0.1 Pa, antenna power of 500 W, bias power of 20 W and etching time of 20 seconds.

Removing the second hard mask remaining on protrusions as illustrated in FIG. 3E was carried out by employing ICP-RIE, using $CF_4$, and establishing a gas pressure of 1.0 Pa, antenna power of 500 W, bias power of 0 W and etching time of 15 seconds.

Performing ion beam etching and also deactivating the magnetic recording layer 52 at the recesses as illustrated in FIG. 3F were carried out using a mixture of helium and nitrogen as the etching gas and establishing a gas pressure of 0.04 Pa, plasma power of 1000 W, accelerating voltage of 1000 V and etching time of 20 seconds.

Removing the first hard mask 53 as illustrated in FIG. 3G was carried out by employing ICP-RIE, using oxygen, and establishing a gas pressure of 1.5 Pa, antenna power of 400 W, bias power of 0 W and etching time of 15 seconds.

The depth of the recesses of the magnetic recording layer 52 after the above processing was found to be 11 nm by TEM observation.

The resultant DTR medium was evaluated by applying a lubricant thereto and mounting the same on a hard disk drive. With respect to the error rate before recording on adjacent tracks, a favorable value of $10^{-6}$ was obtained. When 10,000 recordings were performed on adjacent tracks and the fringe resistance was evaluated, the obtained error rate was $10^{-4.8}$. Thus, the compatibility to DTR media was ascertained. The medium after the measurement was inspected by cross-sectional TEM, and the land/groove ratio thereof was found to be about 3.5. Thus, a wide track width was provided.

Moreover, the medium was manufactured in the same manner except that the etching gas used in the ICP-RIE in the step of FIG. 3C was changed to $SF_6$ or $CHF_3$. The same results as in the use of $CF_4$ were obtained.

Comparative Example 1

A DTR medium was manufactured by carrying out the step of exposing the surface of the first hard mask by the removal of resist residue and the etching of the second hard mask as illustrated in FIG. 3C and the step of exposing the surface of the magnetic recording layer by etching the first hard mask as illustrated in FIG. 3D using the same etching method.

This etching was carried out by means of an ion beam etching apparatus using argon ions at a gas pressure of 0.04 Pa, plasma power of 600 W, accelerating voltage of 600 V, and etching time of 400 seconds. The other steps were the same as in Example 1.

The depth of the recesses of the magnetic recording layer after the above processing was found to be the same 11 nm as in Example 1 by atomic force microscopy. The resultant DTR medium was evaluated by applying a lubricant thereto and mounting the same on a hard disk drive. The error rate before recording on adjacent tracks was $10^{-4.0}$, so that the fringe resistance thereof could not be evaluated, attesting to unsatisfactory compatibility to DTR media. The medium after the measurement was inspected by cross-sectional TEM, and the land/groove ratio thereof was found to be only about 0.8. Thus, it was presumed that the poor error rate was caused by reduced signal intensity due to the narrowness of the lands.

Comparative Example 2

A DTR medium was manufactured by, in the step of exposing the surface of the first hard mask by the removal of resist residue and the etching of the second hard mask as illustrated in FIG. 3C, carrying out the removal of resist residue and the etching of the second hard mask using different methods. Namely, the etching of the three mask layers was carried out using different methods, thereby obtaining a DTR medium.

The removal of resist residue was carried out by means of ICP-RIE using oxygen at a gas pressure of 0.1 Pa, antenna power of 500 W, bias power of 10 W, and etching time of 13, seconds. The etching for the transfer of the patterns of protrusions and recesses to the second hard mask was carried out by means of ICP-RIE using $CF_4$ at a gas pressure of 0.1 Pa, antenna power of 500 W, bias power of 20 W, and etching time of 11 seconds. The other steps were the same as in Example 1.

The depth of the recesses of the magnetic recording layer after the above processing was found to be the same 11 nm as in Example 1 by atomic force microscopy. The resultant DTR medium was evaluated by applying a lubricant thereto and mounting the same on a hard disk drive. The error rate before recording on adjacent tracks was $10^{-3.9}$, so that the fringe resistance thereof could not be evaluated, attesting to unsatisfactory compatibility to DTR media. The medium after the measurement was inspected by cross-sectional TEM, and the land/groove ratio thereof was found to be only about 1.0. Thus, it was presumed that the poor error rate was caused by reduced signal intensity due to the narrowness of the lands.

From the results of Example 1 and Comparative Examples 1 and 2, it is apparent that in the medium after the processing, a higher land/groove ratio can be secured by carrying out both the removal of resist residue and the etching of the second hard mask using the same first etching gas and processing the first hard mask using a second etching gas different from the first etching gas in accordance with the present invention, so that a patterned medium excellent in drive characteristics can be manufactured.

Example 2

Six types of DTR media were manufactured using 3-nm-thick Si, SiC, SiOC, $SiO_2$, SiN and SiON as second hard masks. The same procedure as in Example 1 was repeated except that the etching times for the steps of FIGS. 3C and 3E were appropriately regulated for each of the materials of the second hard masks.

With respect to all the media, the depth of the recesses of the magnetic recording layer after the above processing was found to be the same 11 nm as in Example 1 by atomic force microscopy.

The resultant DTR media were evaluated by applying a lubricant thereto and mounting the same on a hard disk drive. With respect to all the media, in the error rate before recording on adjacent tracks, a favorable value of $10^{-6}$ was obtained. When 10,000 recordings were performed on adjacent tracks and the fringe resistance was evaluated, the obtained error rate was $10^{-4.5}$. Thus, the compatibility to DTR media was ascertained. The media after the measurement were inspected by cross-sectional TEM, and the land/groove ratio thereof was found to be about 3.5. Thus, a wide track width was provided.

From these results, it is apparent that a higher land/groove ratio can be secured by forming the second hard mask from Si, SiC, SiOC, $SiO_2$, SiN or SiON, so that patterned media excellent in drive characteristics can be manufactured.

Example 3

Nine types of DTR media were manufactured using 3-nm-thick Al, Ag, Au, Co, Cr, Cu, Ni, Pd and Pt as second hard masks. The step of FIG. 3C, namely, the step of exposing the surface of the first hard mask by the removal of resist residue and the etching of the second hard mask was carried out by means of ion beam etching in which argon was used as the first etching gas. During the etching, the gas pressure was 0.04 Pa; the plasma power, 600 W; and the accelerating voltage, 400 V. The etching time was appropriately regulated for each of the materials of the second hard masks. For instance, the etching time was 45 seconds when the second hard mask was 3-nm-thick copper. The step of removing the second hard mask remaining on protrusions as illustrated in FIG. 3E was omitted. The removal of any residue of the second hard mask was carried out in the step of deactivating the magnetic recording layer at the recesses by means of ion beam etching as illustrated in FIG. 3F. The other steps were the same as in Example 1.

With respect to all the media, the depth of the recesses of the magnetic recording layer after the above processing was found to be 11 nm by atomic force microscopy.

The resultant DTR media were evaluated by applying a lubricant thereto and mounting the same on a hard disk drive. With respect to all the media, in the error rate before recording on adjacent tracks, a favorable value of $10^{-6}$ was obtained. When 10,000 recordings were performed on adjacent tracks and the fringe resistance was evaluated, the obtained error rate was about $10^{-4.8}$. Thus, the compatibility to DTR media was ascertained. The media after the measurement were inspected by cross-sectional TEM, and the land/groove ratio thereof was found to be about 3.5. Thus, a wide track width was provided.

From these results, it is apparent that a higher land/groove ratio can be secured by forming the second hard mask from Al, Ag, Au, Co, Cr, Cu, Ni, Pd or Pt, so that patterned media excellent in drive characteristics can be manufactured.

Example 4

Five types of DTR media were manufactured using 1-, 2-, 5-, 10- and 15-nm-thick second hard masks consisting of silicon. When the thickness of the second hard mask was 2, 5, 10 or 15 nm, the etching times for the steps of FIGS. 3C and 3E were appropriately regulated for each thickness. When the thickness of the second hard mask was 1 nm, as mentioned below, a problem occurred during the processing, thereby failing to manufacture a DTR medium. The other steps were the same as in Example 1.

When the thickness of the second hard mask was 1 nm, in the removal of the stamper after imprinting in the step of FIG. 3B, the adhesion between the resist and the medium was so poor that a part of the resist was peeled off. Consequently, the mask formation was unsuccessful and a DTR medium could not be manufactured. It was presumed that this failure was caused by thickness dispersion attributed to the fact that the second hard mask was too thin.

With respect to all of the DTR media manufactured using 2-, 5-, 10- and 15-nm-thick second hard masks, the depth of the recesses of the magnetic recording layer after the above processing was found to be the same 11 nm as in Example 1 by atomic force microscopy.

The resultant DTR media were evaluated by applying a lubricant thereto and mounting the same on a hard disk drive. With respect to the DTR media manufactured using 2-, 5- and 10-nm-thick second hard masks, in the error rate before recording on adjacent tracks, a favorable value of $10^{-6}$ was obtained. When 10,000 recordings were performed on adjacent tracks and the fringe resistance was evaluated, the obtained error rate was $10^{-4.5}$. Thus, the compatibility to DTR media was ascertained. The media after the measurement were inspected by cross-sectional TEM, and the land/groove ratio thereof was found to be about 3.5. Thus, a wide track width was provided.

With respect to the DTR medium manufactured using a 15-nm-thick second hard mask, the error rate before recording on adjacent tracks was $10^{-3.6}$, and the evaluation of fringe resistance could not be performed. Thus, the compatibility to DTR media was not attained. The medium after the measurement was inspected by cross-sectional TEM, and the land/groove ratio thereof was found to be only about 1.0. It was presumed that the poor error rate was caused by reduced signal intensity due to the narrowness of the lands.

Example 5

Five types of DTR media were manufactured using 1-, 2-, 5-, 10- and 15-nm-thick second hard masks consisting of copper. When the thickness of the second hard mask was 2, 5, or 15 nm, the step of exposing the surface of the first hard mask by the removal of resist residue and the etching of the second hard mask as illustrated in FIG. 3C was carried out by means of ion beam etching in which argon was used as the first etching gas. During the etching, the gas pressure was 0.04 Pa; the plasma power, 600 W; and the accelerating voltage, 400 V. Further, when the thickness of the second hard mask was 2, 5, 10 or 15 nm, the etching time was appropriately regulated for the particular thickness of the second hard mask. Moreover, the step of removing the second hard mask remaining on protrusions as illustrated in FIG. 3E was omitted, and the removal of any residue of the second hard mask was carried out in the step of deactivating the magnetic recording layer at the recesses by means of ion beam etching as illustrated in FIG. 3F. When the thickness of the second hard mask was 1 nm, as mentioned below, a problem occurred during the processing, thereby failing to manufacture a DTR medium. The other steps were the same as in Example 1.

When the thickness of the second hard mask was 1 nm, as in the manufacturing of a medium using a 1-nm-thick second hard mask consisting of silicon (Example 4), the adhesion between the resist and the medium was so poor that a part of the resist was peeled off in the removal of the stamper after imprinting in the step of FIG. 3B. Consequently, the mask formation was unsuccessful and a DTR medium could not be manufactured.

With respect to all of the DTR media manufactured using 2-, 5-, 10- and 15-nm-thick second hard masks, the depth of the recesses of the magnetic recording layer after the above processing was found to be the same 11 nm as in Example 1 by atomic force microscopy.

The resultant DTR media were evaluated by applying a lubricant thereto and mounting the same on a hard disk drive.

With respect to the DTR media manufactured using 2-, 5- and 10-nm-thick second hard masks, in the error rate before adjacent recording, a favorable value of $10^{-6}$ was obtained. When 10,000 recordings were performed on adjacent tracks and the fringe resistance was evaluated, the obtained error rate was $10^{-4.5}$. Thus, the compatibility to DTR media was ascertained. The media after the measurement were inspected by cross-sectional TEM, and the land/groove ratio thereof was found to be about 3.5. Thus, a wide track width was provided.

With respect to the DTR medium manufactured using a 15-nm-thick second hard mask, the error rate before recording on adjacent tracks was $10^{-3.6}$, and the evaluation of fringe resistance could not be performed. Thus, as in the manufacturing of a medium using a 15-nm-thick second hard mask consisting of silicon performed in Example 4, the compatibility to DTR media was unsatisfactory. The medium after the measurement was inspected by cross-sectional TEM, and the land/groove ratio thereof was found to be only about 1.0. It was presumed that the poor error rate was caused by reduced signal intensity due to the narrowness of the lands.

From these results, it is apparent that when the thickness of the second hard mask is in the range of 2 to 10 nm, the medium after processing can secure a higher land/groove ratio, so that patterned media excellent in drive characteristics can be obtained thereby.

Example 6

Three types of DTR media were manufactured using 4-, 15- and 50-nm-thick first hard masks. The manufacturing thereof was carried out in the same manner as in Example 1 except that in the step of etching the first hard mask as illustrated in FIG. 3D and the step of removing the first hard mask as illustrated in FIG. 3G, the etching time was appropriately regulated for each of the thicknesses of the first hard masks.

With respect to all of the three varieties of DTR media manufactured using 4-, 15- and 50-nm-thick first hard masks, the depth of the recesses of the magnetic recording layer after the above processing was found to be the same 11 nm as in Example 1 by atomic force microscopy.

The resultant DTR media were evaluated by applying a lubricant thereto and mounting the same on a hard disk drive. With respect to all the three types of DTR media, in the error rate before recording on adjacent tracks, a favorable value of $10^{-6}$ was obtained. When 10,000 recordings were performed on adjacent tracks and the fringe resistance was evaluated, the obtained error rate was $10^{-4.5}$. Thus, the compatibility to DTR media was ascertained. The media after the measurement were inspected by cross-sectional TEM, and the land/groove ratio thereof was found to be about 3.5. Thus, a wide track width was provided.

From these results, it is apparent that when the thickness of the first hard mask is in the range of 4 to 50 nm, the medium after processing can secure a higher land/groove ratio, so that patterned media excellent in drive characteristics can be manufactured.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
    forming a first hard mask, a second hard mask selected from the group consisting of Silicon (Si), Silicon carbide (SiC), Silicon oxycarbide (SiOC), Silicon dioxide ($SiO_2$), Silicon nitride (SiN) and Silicon oxynitride (SiON) and having thickness of 2 nm to 10 nm, and a resist on a magnetic recording layer;
    imprinting a stamper to the resist to transfer patterns of protrusions and recesses to the resist;
    removing residues in the recesses of the patterned resist with a first etching gas selected from the group consisting of Tetrafluoromethane ($CF_4$), Sulfur hexafluoride ($SF_6$) and Trifluoromethane ($CHF_3$);
    etching the second hard mask with the first etching gas using the patterned resist as a mask to transfer the patterns of protrusions and recesses to the second hard mask;
    etching the first hard mask with a second etching gas using the second hard mask as a mask to transfer the patterns of protrusions and recesses to the first hard mask; and
    ion beam etching to deactivate the magnetic recording layer exposed in the recesses and to remove the second hard mask.

2. The method of claim 1, wherein the second etching gas is oxygen.

3. The method of claim 1, wherein the first hard mask has a thickness of 4 nm to 50 nm.

4. The method of claim 1, wherein the first hard mask comprises carbon and has a thickness of 4 nm to 50 nm.

5. The method of claim 4, wherein the first hard mask comprises about at least 75% of carbon in terms of a ratio of number of atoms.

6. A method of manufacturing a magnetic recording medium, comprising:
    forming a first hard mask, a second hard mask selected from the group consisting of Aluminum (Al), Silver (Ag), Gold (Au), Cobalt (Co), Chromium (Cr), Copper (Cu), Nickel (Ni), Palladium (Pd) and Platinum (Pt) and having thickness of 2 nm to 10 nm, and a resist on a magnetic recording layer;
    imprinting a stamper to the resist to transfer patterns of protrusions and recesses to the resist;
    removing residues in the recesses of the patterned resist with a first etching gas of Argon (Ar);
    etching the second hard mask with the first etching gas using the patterned resist as a mask to transfer the patterns of protrusions and recesses to the second hard mask;
    etching the first hard mask with a second etching gas using the second hard mask as a mask to transfer the patterns of protrusions and recesses to the first hard mask; and
    ion beam etching to deactivate the magnetic recording layer exposed in the recesses and to remove the second hard mask.

7. The method of claim 6, wherein the second etching gas is oxygen.

8. The method of claim 6, wherein the first hard mask has a thickness of 4 to 50 nm.

9. The method of claim 8, wherein the first hard mask comprises carbon.

10. The method of claim 9, wherein the first hard mask comprises at least about 75% of carbon in terms of a ratio of number of atoms.

* * * * *